United States Patent
Belcher (10) Patent No.: US 7,377,234 B2
(45) Date of Patent: May 27, 2008

(54) PORTABLE ANIMAL TRACKING SYSTEM

(75) Inventor: Donald K. Belcher, New Smyrna Beach, FL (US)

(73) Assignee: Radio Systems Corporation, Knoxville, TN (US)

( * ) Notice: Subject to any disclaimer, the term of this patent is extended or adjusted under 35 U.S.C. 154(b) by 372 days.

(21) Appl. No.: 11/195,307

(22) Filed: Aug. 2, 2005

(65) Prior Publication Data

US 2006/0037559 A1    Feb. 23, 2006

Related U.S. Application Data

(60) Provisional application No. 60/598,042, filed on Aug. 2, 2004, provisional application No. 60/598,044, filed on Aug. 2, 2004.

(51) Int. Cl.
*A01K 29/00* (2006.01)

(52) U.S. Cl. .................................... 119/720; 340/573.3

(58) Field of Classification Search ................ 119/720, 119/719, 721, 908; 340/573.2, 573.3, 573.4
See application file for complete search history.

(56) References Cited

U.S. PATENT DOCUMENTS

| | | | | |
|---|---|---|---|---|
| 5,787,841 A | * | 8/1998 | Titus et al. | 119/721 |
| 5,844,489 A | * | 12/1998 | Yarnall et al. | 340/573.3 |
| 6,019,066 A | * | 2/2000 | Taylor | 119/720 |
| 6,163,261 A | * | 12/2000 | Westrick | 340/573.3 |
| 6,441,778 B1 | * | 8/2002 | Durst et al. | 342/357.07 |
| 6,575,120 B1 | * | 6/2003 | Stapelfeld et al. | 119/720 |
| 6,600,422 B2 | * | 7/2003 | Barry et al. | 340/573.3 |
| 6,923,147 B1 | * | 8/2005 | Davis | 119/721 |
| 7,142,167 B2 | * | 11/2006 | Rochelle et al. | 343/867 |

* cited by examiner

*Primary Examiner*—Yvonne R. Abbott
(74) *Attorney, Agent, or Firm*—Pitts & Brittian, PC (57) ABSTRACT

A portable animal tracking system. The portable animal tracking system provides two-way communication between a first unit carried by an operator and a second unit carried by an animal. The first unit allows an operator to issue warnings or corrections to an animal and to locate an animal. The second unit delivers warnings and corrections to the animal by the second unit and responds to location requests from the first unit. Location is accomplished through an angular-bearing analysis.

14 Claims, 6 Drawing Sheets

PORTABLE ANIMAL TRACKING SYSTEM

CROSS-REFERENCE TO RELATED APPLICATIONS

This application claims the benefit of U.S. Provisional Application No. 60/598,042, filed Aug. 2, 2004 and U.S. Provisional Application No. 60/598,044, filed Aug. 2, 2004.

STATEMENT REGARDING FEDERALLY SPONSORED RESEARCH OR DEVELOPMENT

Not Applicable

BACKGROUND OF THE INVENTION

1. Field of Invention

The invention relates to animal tracking devices. More specifically, this invention relates to an electronic animal tracking device based on instantaneous direction of arrival determination.

2. Description of the Related Art

Free-roaming animals have the potential of being out of the owner's sight, effectively lost. Whether an escaped house pet or a sporting dog in the field, a simple and reliable mechanism for locating the animal is desirable.

Other devices have been used to locate out-of-sight animals. Common in the sport dog industry is the beeper locator. The beeper locator generates an audible alert that allows the sportsman to locate the animal. Location using the audible technique is limited both in precision and in range by a number of factors including the sportsman's hearing and the density of the vegetation in the area. Further, the beeper locators are generally suitable for use in wilderness settings when activated prior to the controlled release of the animal, i.e., a sporting dog released to track. In a populated setting, the beeper locator has the potential to be disturbing to others if constantly sounding.

In addition to beeper locators, other devices using satellite, e.g., a global positioning system (GPS), or cellular technologies have been developed to locate animals. These devices are predicated on the support of an existing third-party infrastructure. While there is currently no fee associated with the use of GPS signals, cellular providers charge for the use of their networks. Both GPS and cellular technologies have varying quality of service that is primarily location dependent. Dependence on a third-party infrastructure exposes the animal owner to limitations on service that are outside the control of the equipment manufacturer and the possibility of recurring service fees.

BRIEF SUMMARY OF THE INVENTION

A portable animal tracking system is shown and described. The portable animal tracking system provides two-way communication between a first unit carried by an operator and a second unit carried by an animal. The first unit allows an operator to issue warnings or corrections to an animal and to locate an animal. The second unit delivers warnings and corrections to the animal by the second unit and responds to location requests from the first unit. Location is accomplished through an angular-bearing analysis.

The portable animal tracking system includes a portable transceiver and a portable transponder. The transceiver is generally a hand-held unit carried by an operator and the transponder is generally a collar-mounted unit carried by an animal.

The operator of the hand-held unit has the ability to send training commands to one or more different animals. Each collar-mounted unit is addressed by a unique code for that animal allowing each animal to be individually managed as desired by the operator. The hand-held unit has a provision for the operator to select which animal to command. Alternatively, the operator can manage the animals as a group.

When the location of an animal is desired, the operator sends a request to the specific collar-mounted unit associated with the animal. The request commands the collar-mounted unit to transmit a response from which the location of the animal is tracked. The response is either a single pulse for use when the operator and/or animal are relatively stationary or a series of pulses that are continuously and periodically transmitted for use when the operator and/or animal are in motion. The location of the animal relative to the hand-held unit is communicated to the operator.

The hand-held unit includes three separate antennas. The signals received at the three antennas are used to compute a direction-of-arrival. A toroidal structure is inductively coupled with the output of the antennas facilitates use of the three antennas, individually for reception and cooperatively for transmission.

A quadrature down converter converts the outputs of the antennas to baseband signals and a quadrature analog-to-digital converter (ADC) converts the analog baseband signals to digital signals. The digital signals are processed by a signal processor to obtain all of the necessary information contained in the received signals. The signal processor uses the information from the received signals to perform the direction-of-arrival computations.

All the conversions and processing electronics are driven by a master oscillator that includes the transmit modulation function. The modulated transmit signals are amplified by a power amplifier to a sufficient amplitude to enable the desired range to be achieved.

A display in communication with the processor indicates the direction of the pet relative to the hand-held unit based on the direction-of-arrival computations. The display enables the operator to move in the direction of the pet.

The dimensions of the hand-held unit are selected to allow antennas to be spaced apart by approximately one-eighth of a wavelength. The top surface of the hand-held unit contains the display that communicates the position of the animal relative to the hand-held unit to the operator. The display includes at least a directional indicator that communicates the approximate bearing to the animal to the operator once the approximate bearing has been calculated and an animal indicator that identifies the collar-mounted unit associated with the direction information.

The hand-held unit includes controls that allow the selection of various parameters and functions associated with the portable animal tracking system. The location of the controls varies according to the physical layout of the hand-held unit. A first control allows the operator to select a unique identifier to address a specific collar-mounted unit. A second control controls the operation mode of the portable animal tracking system. A third control allows selection of the method of training. A fourth control allows selection of one-shot or continuous tracking. A trigger, which is protected behind an associated trigger guard, initiates the transmission of a command signal to the collar-mounted unit.

The collar-mounted unit includes a reception antenna in communication with a receiver. The receiver accepts commands and queries from the hand-held unit. In one embodiment, the receiver includes a down converter and an analog-to-digital converter. The down converter converts the received signals into a baseband signal and the analog-to-digital converter converts the baseband signal into a digital signal. A processor in communication with the receiver demodulates the digital signal and decodes the data contained in the demodulated signal.

The processor also forms a response for transmission when requested. The response is combined by with a signal generated by a frequency generator at a mixer to produce a modulated transmission signal. The processor also controls an amplifier that amplifies the modulated transmission signal to a desired output level at the transmit antenna, for example a relatively high power signal (e.g., one watt) to the transmit antenna.

The transmissions from the collar-mounted unit provide at least two functions. A first function is to provide information about the status of the animal to the operator. A second function is to provide a response that is used to determine the angular bearing of the collar-mounted unit relative to the hand-held unit.

The collar-mounted unit includes a housing that carries the associated electronics described earlier. A pair of electrodes extends from the housing to make electrical contact with the skin of the animal allowing a correction stimulus to be applied. The housing is carried by a collar adapted to be placed around the animal, for example, around the animal's neck. One or more high-efficiency loop antennas are used with the collar-mounted unit for transmission and reception of signals. The antennas are attached to or integrated into the collar.

The direction-of-arrival determination is based on comparing the product of the signals on the antennas in the hand-held unit. In order to obtain meaningful information, the three antennas of the hand-held unit are spatially separated enough to allow angular determination. In addition, the antennas of the hand-held unit are relatively uncoupled. If mutual coupling exists and is excessive, the angular bearing determination will suffer a large error.

The principle of operation is based on the propagation of radio signals as they pass by the antennas. Depending on the direction of arrival, the radio signal passes by the antennas at different times. Because the spacing of the antennas is a fraction of a wavelength, comparing the relative phase of the radio signals from each antenna provides the time difference from which the direction of arrival is obtained.

By arranging the received signals from each antenna to be multiplied together, and maintaining each signal at a constant amplitude, the relative phase between each pair of products is determined. A multiplier with both inputs held constant is essentially a relative phase detector. A simple derived mathematical expression produces numerical results that enable the processor to compute the approximate angle of arrival.

Using this technique for determining the direction of arrival, the calculation of angle is very quick and requires a minimal amount of processing. Further, the function of the multiplicative process (and the angle calculation) is practically independent of the type of modulation provided the modulation is relatively narrow-band.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A portable animal tracking system is shown and described at 100 in the figures. The portable animal tracking system provides two-way communication between a first unit carried by an operator and a second unit carried by an animal. The first unit allows an operator to issue warnings or corrections to an animal and to locate an animal. The second unit delivers warnings and corrections to the animal by the second unit and responds to location requests from the first unit. Location is accomplished through an angular-bearing analysis.

Figure 1:
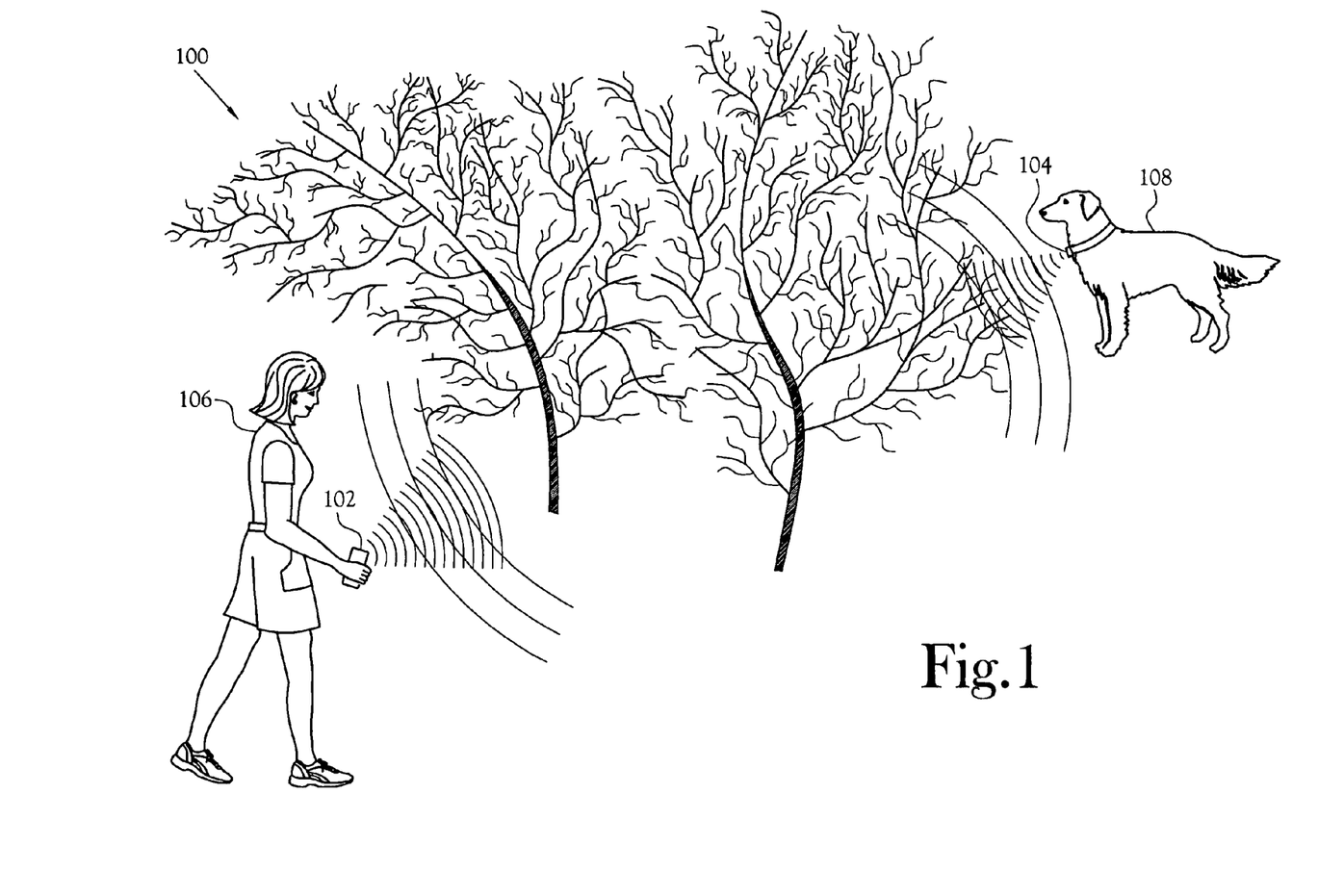
FIG. 1 is an illustration of a portable animal tracking system according to the present invention.

FIG. 1 illustrates the general usage of the portable animal tracking system 100. The portable animal tracking system 100 includes a portable transceiver 102 and a portable transponder 104. In the illustrated embodiment, the transceiver 102 is a hand-held unit carried by an operator 106. The transponder 104 is a collar-mounted unit carried by an animal 108.

The operator 106 of the hand-held unit 102 has the ability to send training commands to one or more different animals 108. Each collar-mounted unit 104 is addressed by a unique code for that animal 108 allowing each animal 108 to be individually managed as desired by the operator 106. The hand-held unit 102 has a provision for the operator 106 to select which animal 108 to command. Alternatively, the operator 106 can manage the animals as a group.

When the location of an animal is desired, the operator 106 sends a request to the specific collar-mounted unit 104 associated with the animal 108. The request commands the collar-mounted unit 104 to transmit a response from which the location of the animal 108 is tracked. The response is either a single pulse for use when the operator 106 and/or animal 108 are relatively stationary or a series of pulses that are continuously and periodically transmitted for use when the operator 106 and/or animal 108 are in motion. The location of the animal 108 relative to the hand-held unit 102 is communicated to the operator 106.

Figure 2:
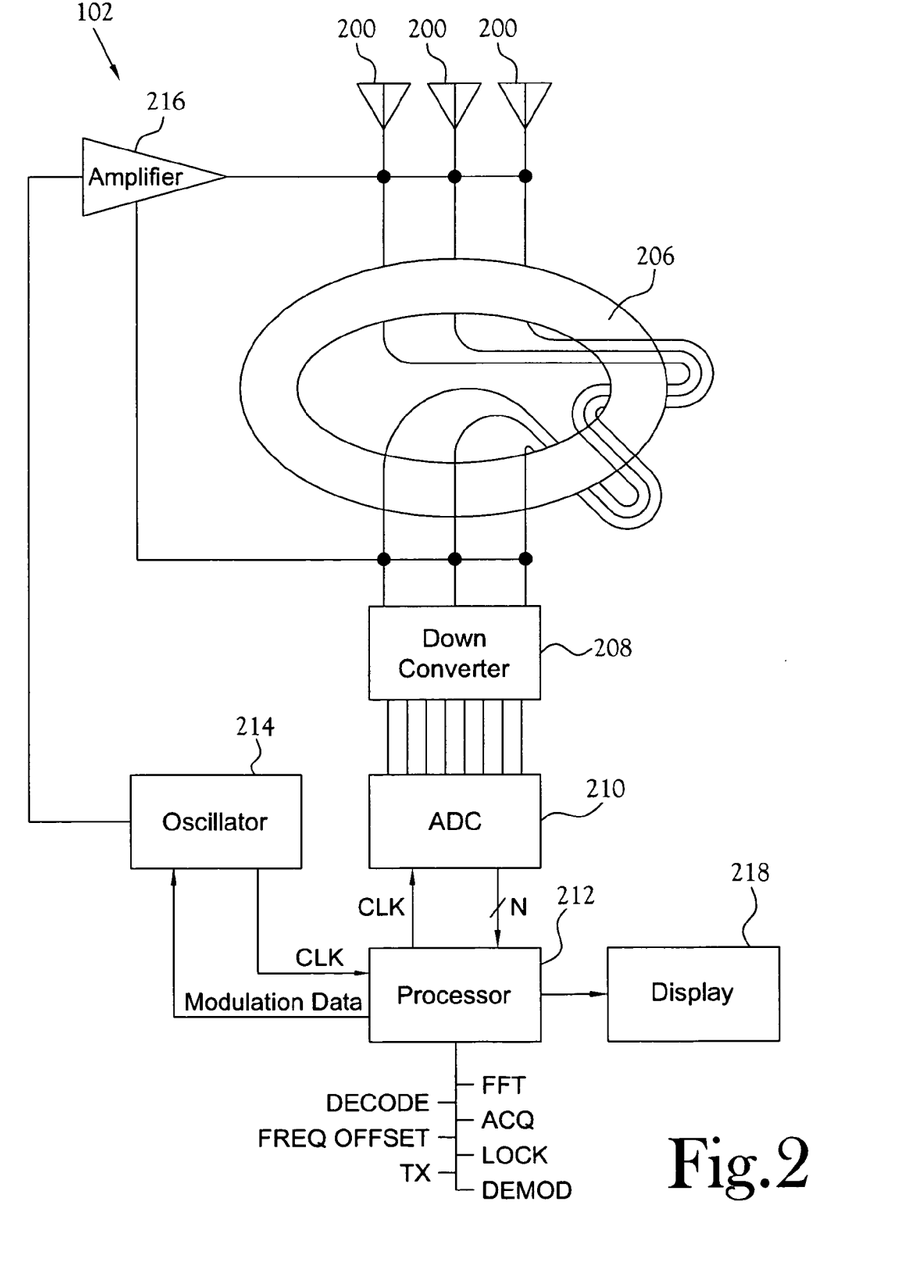
FIG. 2 is a block diagram of one embodiment of the portable transceiver of the portable animal tracking system.

FIG. 2 is a block diagram of one embodiment of the hand-held unit. The hand-held unit includes three separate antennas 200, 202, 204. The signals received at the three antennas 200, 202, 204 are used to compute a direction-of-arrival.

A toroidal structure 206 near the antennas 200, 202, 204 represents a unique way of using the three antennas 200, 202, 204 individually for reception to facilitate the direction-of-arrival function and cooperatively for transmission to provide an omnni-directional broadcast. The toroidal structure 206 operates to create a high impedance to ground thus enabling the three antennas to be electrically driven in common, which in turns creates an omnidirectional transmit antenna.

A quadrature down converter 208 converts the outputs of the antennas 200, 202, 204 to baseband signals and a quadrature analog-to-digital converter (ADC) 210 converts the analog baseband signals to digital signals. The digital signals are processed by a signal processor 212 to obtain all of the necessary information contained in the received signals. The signal processor 212 uses the information from the received signals to perform the direction-of-arrival computations.

All the conversions and processing electronics are driven by a master oscillator 214 that includes the transmit modulation function. The modulated transmit signals are amplified by a power amplifier 216 to a sufficient amplitude to enable the desired range to be achieved.

A display 218 in communication with the processor 212 indicates the direction of the pet relative to the hand-held unit based on the direction-of-arrival computations. The display 218 enables the operator to move in the direction of the pet.

Figure 3:
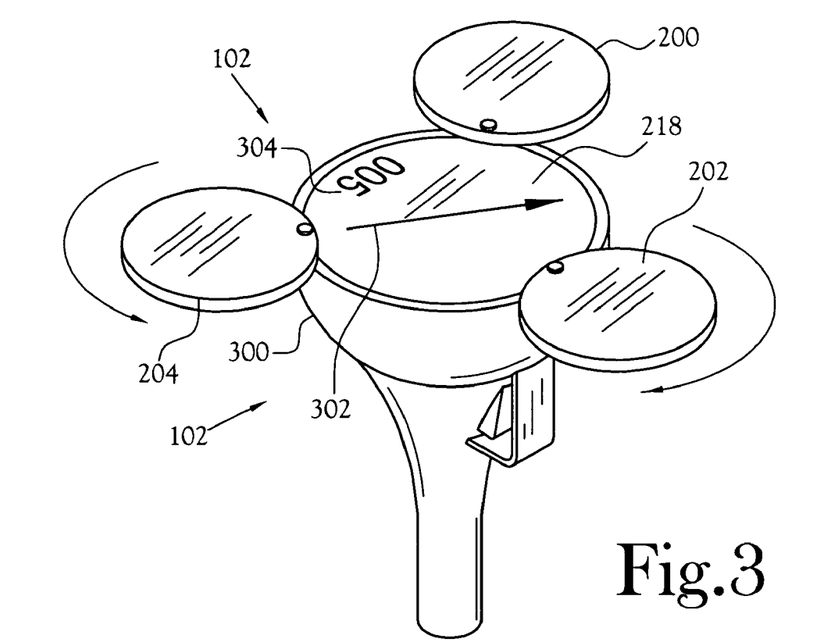
FIG. 3 is a perspective view of one embodiment of the portable transceiver of the portable animal tracking system.

FIG. 3 illustrates one embodiment of the hand-held unit 104. As described earlier, the hand-held unit 102 has three antennas 200, 202, 204. The dimensions of the hand-held unit 102 are selected to allow antennas 200, 202, 204 to be spaced apart by approximately one-eighth of a wavelength. In one embodiment, the portable animal tracking system 100 operates in the Multi-Use Radio Service band, which uses five shared channels in the 151-155 MHz range. One-eighth of a wavelength for a 150 MHz signal is approximately ten (10) inches. Accordingly, the diameter of the hand-held unit 102 allows the antennas 200, 202, 204 to be spaced approximately ten to twelve inches apart. In use the antennas 200, 202, 204 extended beyond the body of the hand-held unit 102.

The top surface 300 of the hand-held unit 102 contains the display 218 that communicates the position of the animal 108 relative to the hand-held unit 104 to the operator 106. The display 218 includes at least a directional indicator 302 that communicates the approximate bearing to the animal 108 to the operator 106 once the approximate bearing has been calculated. In one embodiment, the display 218 is a screen, such as a liquid crystal display (LCD) and the directional indicator 302 is an arrow that is displayed on the LCD and points in the general direction of the animal 108. The same result can be implemented using a pointing needle positioned using mechanical or magnetic forces. In another embodiment, the display 218 is a series of indicators, such as light emitting diodes (LEDs) arranged around the perimeter of the display 218. One or more of the LEDs illuminates to indicate the general direction of the animal 108 relative to the hand-held unit 102. In another embodiment designed for use with more than one collar-mounted unit 104, the display 218 includes an animal indicator 304 that identifies the collar-mounted unit 104 for which direction information is shown. The animal indicator is implemented by displaying an alpha-numeric or symbolic identifier for the associated collar-mounted unit using a LED or LCD display. In other embodiments, the animal indicator is an audible sound generator that identifies the animal by unique audible frequencies or patterns. In still other embodiments, visual cues such as different color lamps or LEDs are used.

Figure 4:
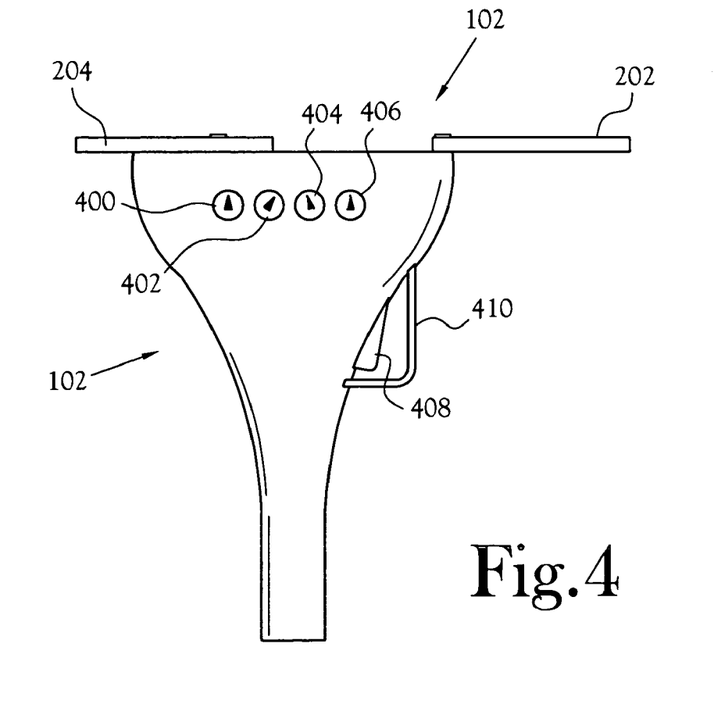
FIG. 4 is a side elevation view of one embodiment of the portable transceiver of the portable animal tracking system.

FIG. 4 illustrates a side elevation view of the hand-held unit 102. The hand-held unit 102 includes controls that allow the selection of various parameters and functions associated with the portable animal tracking system 100. The location of the controls varies according to the physical layout of the hand-held unit 102. In the illustrated embodiment, a first control 400 for use in a portable animal tracking system capable of addressing more than one collar-mounted unit 104 is shown. The first control 400 allows the operator to select a unique identifier to address a specific collar-mounted unit 104. A second control 402 is shown to control the operation mode of the portable animal tracking system 100. Available operation modes include tracking and training, where tracking is used to locate an animal and training is used to apply a warning stimulus or a corrective stimulus when necessary. A third control 404 allows selection of the method of training, for example, the application of an audible warning or a corrective shock. A fourth control 406 allows selection of one-shot or continuous tracking. A trigger 408 with an associated trigger guard 410 is shown for initiating the transmission of a command signal to the collar-mounted unit 104. The processor reads the controls and produces a code that is embedded in the request signal to provide instructions to the collar-mounted unit. Those skilled in the art will recognize other appropriate controls, such as a power switch, that may be implemented on the hand-held unit 102 depending upon the desired feature set.

Figure 5:
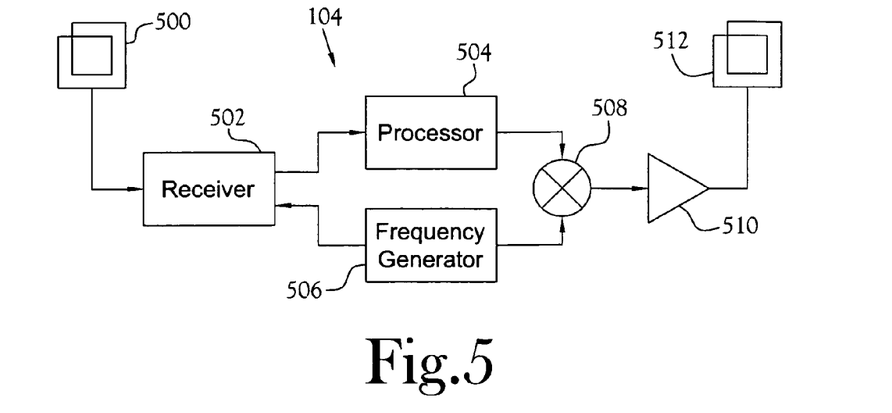
FIG. 5 is a block diagram of one embodiment of the portable transponder of the portable animal tracking system.

FIG. 5 is a block diagram of one embodiment of the collar-mounted unit 104. The collar-mounted unit 104 includes a reception antenna 500 in communication with a receiver 502. In the illustrated embodiment, the reception antenna 500 is a wire-loop antenna. The receiver 502 accepts commands and queries from the hand-held unit 104. In one embodiment, the receiver 104 includes a down converter and an analog-to-digital converter. The down converter converts the received signals into a baseband signal and the analog-to-digital converter converts the baseband signal into a digital signal. A processor 504 in communication with the receiver 502 demodulates the digital signal and decodes the data contained in the demodulated signal.

The processor 504 also forms a response for transmission when requested. The response is combined with a signal generated by a frequency generator 506 at a modulator 508 to produce a modulated transmission signal. The modulator 508 creates frequency, phase, or amplitude modulations or any combination of these. The processor 504 also controls an amplifier 510, such as a radio frequency power amplifier, that amplifies the modulated transmission signal to a desired output level at the transmit antenna 512, for example a relatively high power signal (e.g., one watt) to the transmit antenna. Finally, the processor 504 activates a stimulus generator when a training command is received. Those skilled in the art will recognize the various types of stimulus generators that may be used with departing from the scope and spirit of the present invention, such as an audible sound generator, an ultrasonic sound generator, a spray deterrent generator, an electrical shock generator, or a mechanical vibration generator.

The transmissions from the collar-mounted unit 104 provide at least two functions. A first function is to provide information about the status of the animal to the operator. A second function is to provide a response that is used to determine the angular bearing of the collar-mounted unit 104 relative to the hand-held unit 102.

Figure 6:
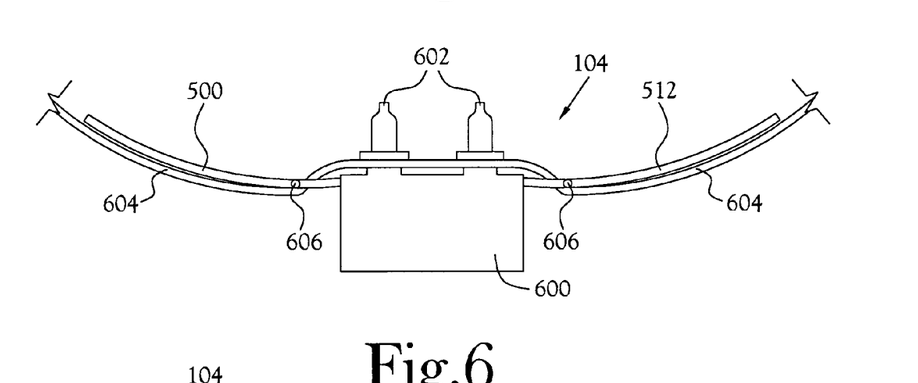
FIG. 6 is a perspective view of one embodiment of the portable transponder of the portable animal tracking system.
Figure 7:
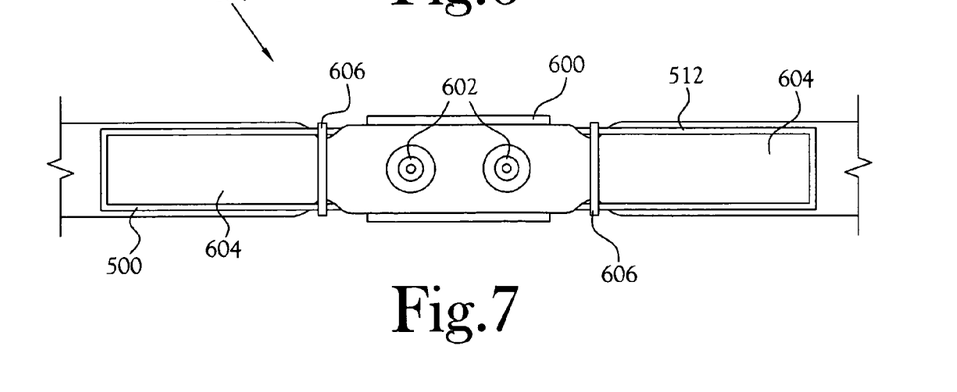
FIG. 7 is a side elevation view of one embodiment of the portable transceiver of the portable animal tracking system.

FIG. 6 illustrates a side elevation view of one embodiment of the collar-mounted unit 104. The collar-mounted unit 104 includes a receiver housing 600 that carries the associated electronics, such as that described in relation to FIG. 5. A pair of electrodes 602 extends from the housing to make electrical contact with the skin of the animal allowing a correction stimulus to be applied. Those skilled in the art will recognize other appropriate stimulus delivery mechanisms depending upon the selected stimulus used for training purposes. The housing 600 is carried by a collar 604 adapted to be placed around the animal, for example, around the animal's neck. One or more high-efficiency loop antennas 500, 512 are used with the collar-mounted unit 104 for transmission and reception of signals. Those skilled in the art will appreciate that other types of antennas can be used without departing from the scope and spirit of the present invention. In the illustrated embodiment, two loop antennas 500, 512 are shown. By using separate antennas 500, 512 for transmission and reception the need for a transmit/receive switch and all its attendant complication and reduction in efficiency is eliminated. However, those skilled in the art will appreciate other embodiments include that a switch to enable one antenna to serve both functions. The antenna 500, 512 are attached to or integrated into the collar 604. In the illustrated embodiment, each of the loop antennas 500, 512 include a post 606 that helps define the shape of the antenna. In addition, the collar 604 is routed around the post 606. FIG. 7 is bottom plan view of the embodiment of the collar-mounted unit 104 shown in FIG. 6 illustrating the collar 604 threaded through around the posts 606.

Figure 8:
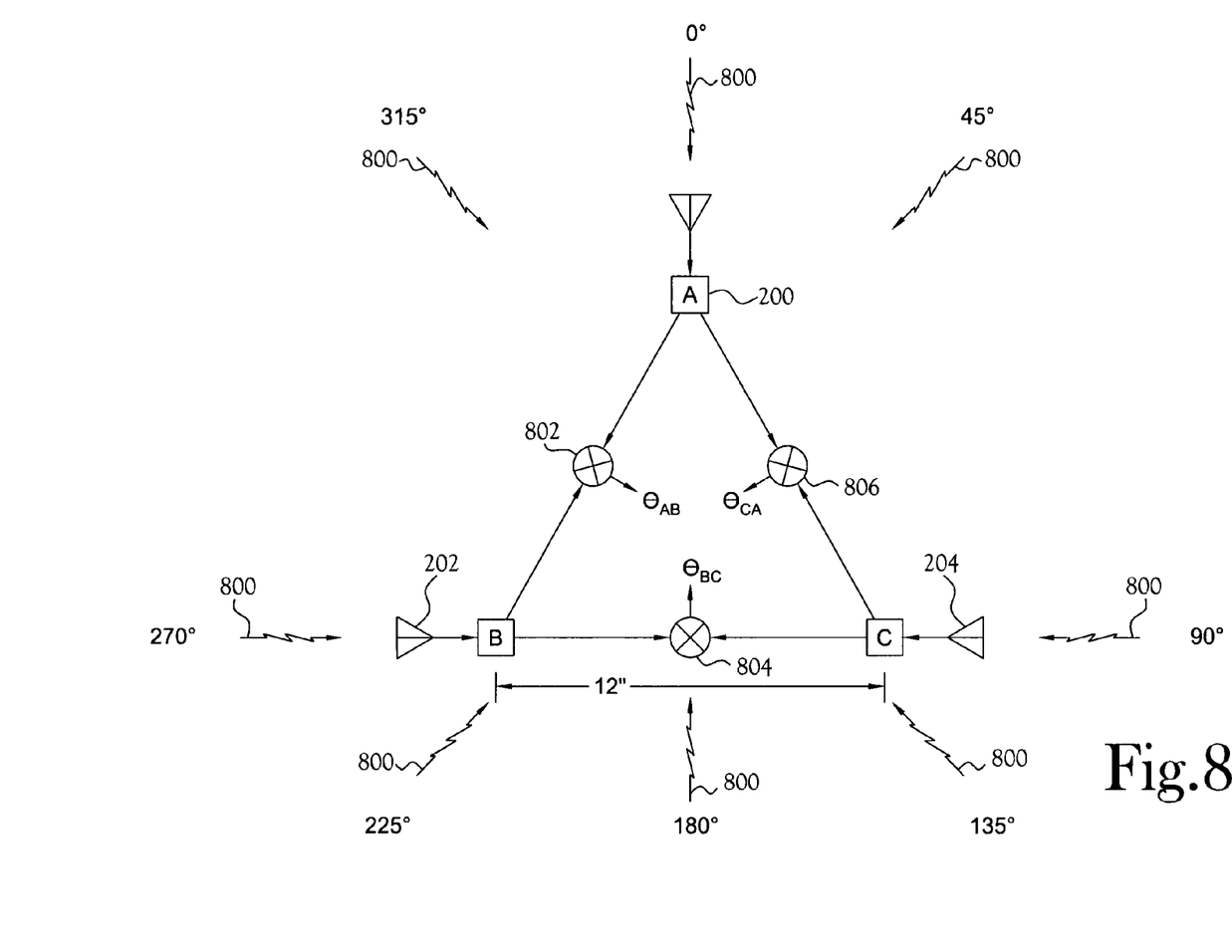
FIG. 8 is a representation of the of the portable transceiver response to the location signal from the portable transponder.

FIG. 8 illustrates the principle of operation for the direction-of-arrival determination used in the present invention. The direction-of-arrival determination is based on comparing the product of the signals on the antennas 200, 202, 204 in the hand-held unit 102. In order to obtain meaningful information, the three antennas 200, 202, 204 of the hand-held unit 102 are spatially separated enough to allow angular determination. In one embodiment, the spatial separation of the antennas 200, 202, 204 of the hand-held unit 102 is accomplished by spatially separating the antennas by more than thirty degrees. In addition, the antennas 200, 202, 204 of the hand-held unit 102 are relatively uncoupled. If mutual coupling exists and is excessive, the angular bearing determination will suffer a large error.

The principle of operation is based on the propagation of radio signals 800 as they pass by the antennas 200, 202, 204. Depending on the direction of arrival, the radio signal 800 passes by the antennas 200, 202, 204 at different times. In the illustrated embodiment, the antennas 200, 202, 204 are separated by forty-five degrees. Because the spacing of the antennas 200, 202, 204 is a fraction of a wavelength, comparing the relative phase of the radio signals 800 from each antenna 200, 202, 204 provides the time difference from which the direction of arrival is obtained.

By arranging the received signals from each antenna 200, 202, 204 to be multiplied together, and maintaining each signal at to constant amplitude, the relative phase between each pair of products is determined. A multiplier 802, 804, 806 with both inputs held constant is essentially a relative phase detector. A simple derived mathematical expression that produces the numerical results shown in the table below enables the processor to compute the approximate angle of arrival.

| Angle of Arrival | $\Theta_{CA}$ | $\Theta_{AB}$ | $\Theta_{BC}$ |
|---|---|---|---|
| 0° | 0.675 | 0.675 | 1.000 |
| 45° | 0.969 | 0.601 | 0.780 |
| 90° | −0.887 | 0.887 | 0.575 |
| 135° | −0.601 | −0.969 | 0.180 |
| 180° | −0.675 | −0.675 | 1.000 |
| 225° | −0.969 | −0.601 | −0.780 |
| 270° | −0.887 | −0.887 | −0.575 |
| 315° | 0.601 | 0.969 | −0.780 |

Although the table is computed for 45 degree increments, various embodiments have greater resolution (e.g. 11¼ increments).

Using this technique for determining the direction of arrival, the calculation of angle is very quick and requires a minimal amount of processing. Further, the function of the multiplicative process (and the angle calculation) is practically independent of the type of modulation provided the modulation is relatively narrow-band. In another embodiment, radio signal strength indication (RSSI) information is used to determine an approximate distance to the animal 108.

In another embodiment, an alternate technique for determining the direction-of-arrival is used. For reference, the alternate technique is similar to VHF Omnidirectional Range (VOR) navigation where a ground station transmits an omnidirectional signal and a signal that rotates in azimuth. The airborne plane electronically compares the two signals and computes the angular direction to the ground station.

Figure 9:
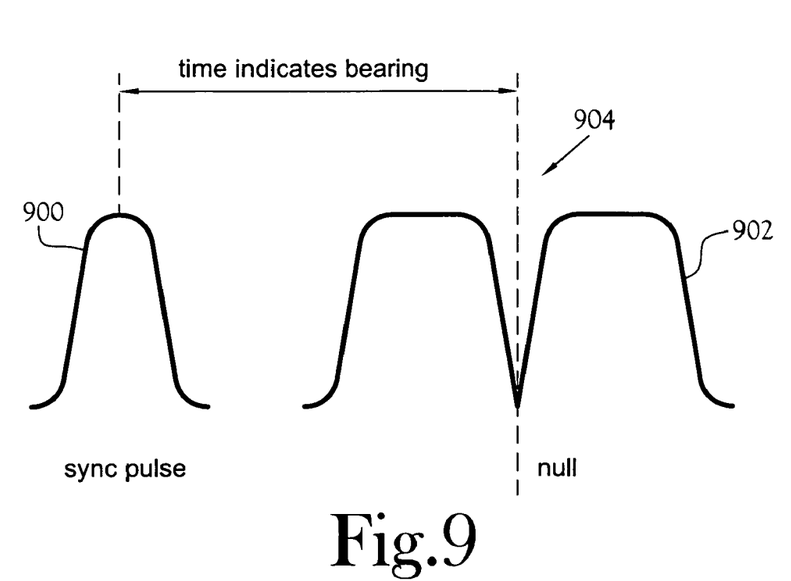
FIG. 9 is an illustration of the signal pattern seen at the portable transponder by in an alternate embodiment of a direction of arrival determination technique.

In the alternate embodiment, the hand-held unit 102 is analogous to the ground station and transmits two signals in sequence, an omnidirectional pulse followed by a signal that rotates and sweeps a null 360 degrees in azimuth. FIG. 9 illustrates the signals received by the collar-mounted unit 104: a synchronizing pulse 900 followed some time later by a signal 902 having a sharp and quick null 904. The time between the synchronization pulse 900 and the null 904 represents the angular bearing between the collar-mounted unit 104 and the hand-held unit 102. The fundamental system difference of the alternate embodiment is that the collar-mounted unit actually must perform the angle determination and transmit the calculated angle back to the hand-held unit.

Figure 10:
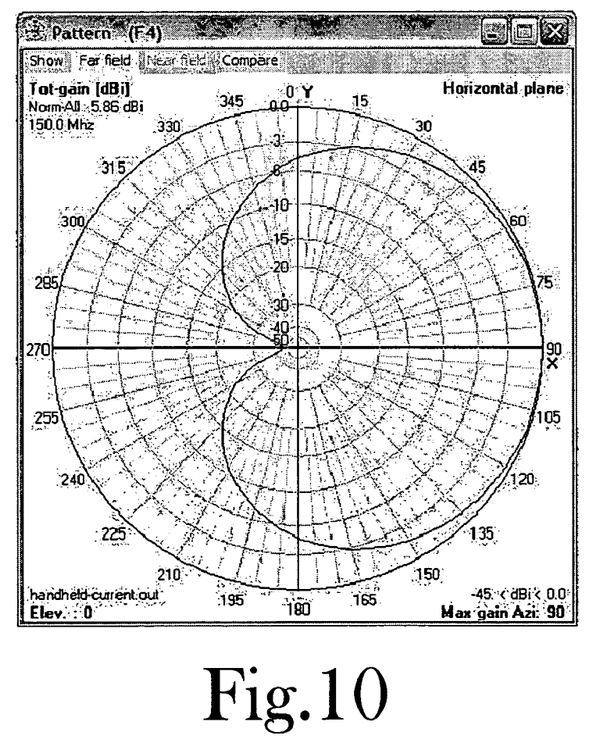
FIG. 10 is an illustration of a radiation pattern of the portable transceiver for use in the direction of arrival determination technique of FIG. 9.

FIG. 10 illustrates the type of antenna radiation pattern that is generated by the hand-held unit. With three antennas, it is straightforward to generate the appropriate phase modulation pattern on each antenna to generate the overall antenna pattern shape shown in FIG. 10. By electronically varying the phases in the three antennas, the cardioid pattern is continuously rotated over 360 degrees.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An apparatus for locating an animal, said apparatus comprising:
a transponder comprising:
a at least one antenna;
a receiver in communication with said at least one antenna, said transponder receiver converting a request signal received by said at least one antenna into a transponder digital signal;
a transmitter in communication with said at least one antenna, said transponder transmitter sending a response signal through said at least one antenna; and
a processor in communication with said transponder receiver and said transponder transmitter, said transponder processor generating data included in said response signal; and
a transceiver comprising:
a plurality of antennas;
a transmitter in communication with at least one of said plurality of antennas, said transceiver transmitter sending said request signal through said at least one of said plurality of antennas;
a receiver in communication with said plurality of antennas, said transceiver receiver converting said response signal received by said plurality of antennas into at least one transceiver digital signal;
a processor in communication with said transceiver receiver and said transceiver transmitter, said transceiver processor determining a direction of arrival associated with said response signal from said at least one transceiver digital signal; and
a display in communication with said processor, said display communicating said direction of arrival.

2. The apparatus of claim 1 wherein said receiver includes a down-converter.

3. The apparatus of claim 1 wherein said receiver includes an analog-to-digital converter.

4. The apparatus of claim 1 wherein said processor demodulates said digital signal as a demodulated signal, said demodulated signal being decoded by said processor.

5. The apparatus of claim 1 wherein said at least one antenna includes a first antenna in communication with said receiver and a second antenna in communication with said transmitter.

6. The apparatus of claim 1 wherein each of said plurality of antennas are separated from each other of said plurality of antennas by a distance greater than or substantially equal to one-eighth of a wavelength.

7. The apparatus of claim 1 wherein each of said plurality of antennas are spatially separated from each other of said plurality of antennas by an angle greater than or substantially equal to 30 degrees.

8. The apparatus of claim 1 wherein each of said plurality of antennas is substantially uncoupled from each other of said plurality of antennas.

9. The apparatus of claim 1 wherein said transceiver receiver receives a separate input from each of said plurality of antennas, each said input being multiplied with each other input to produce a plurality of product signals, said plurality of product signals forming separate components of said transceiver digital signal.

10. The apparatus of claim 9 wherein said processor calculates a phase angle for each of plurality of product signals, a set of said phase angles corresponding to an angular bearing of said transponder relative to said transceiver.

11. The apparatus of claim 1 wherein said plurality of antennas includes a first antenna, a second antenna, and a third antenna, said plurality of antennas being offset from each other of said plurality of antennas by approximately 45 degrees.

12. The apparatus of claim 1 wherein said request signal sent by said transceiver includes a synchronizing pulse followed by a second signal sweeping a null in a 360 degree azimuth, said transponder staffing a timer on reception of said synchronizing pulse and stopping said timer on detection of said null to produce a time value, said time value corresponding to an angular bearing of said transponder relative to said transceiver, said response signal including said time value.

13. The apparatus of claim 1 wherein said transceiver further comprises an activator for generating said request signal.

14. The apparatus of claim 1 wherein said transponder further comprises a stimulus generator in communication with said transponder processor and a stimulus delivery device in communication with said stimulus generator, said processor activating said stimulus generator in response to a training code within said request signal, said stimulus generator producing a stimulus communicated to the animal by said stimulus delivery device.

* * * * *